US012530566B2

(12) United States Patent
Kumar et al.

(10) Patent No.: US 12,530,566 B2
(45) Date of Patent: Jan. 20, 2026

(54) METHOD AND SYSTEM FOR LEARNING BEHAVIOR OF HIGHLY COMPLEX AND NON-LINEAR SYSTEMS

(71) Applicant: Jio Platforms Limited, Gujarat (IN)

(72) Inventors: Shailesh Kumar, Telangana (IN); Palash Sethi, Pradesh (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 739 days.

(21) Appl. No.: 17/822,013

(22) Filed: Aug. 24, 2022

(65) Prior Publication Data

US 2023/0066478 A1      Mar. 2, 2023

(30) Foreign Application Priority Data

Aug. 24, 2021   (IN) ............................. 202121038214

(51) Int. Cl.
  *G06N 3/00*      (2023.01)
  *G06N 3/048*     (2023.01)
  *G06N 3/08*      (2023.01)

(52) U.S. Cl.
  CPC ............... *G06N 3/048* (2023.01); *G06N 3/08* (2013.01)

(58) Field of Classification Search
  CPC .......... G06N 3/048; G06N 3/08; G06N 3/047; G06N 5/01; G06N 20/00
  See application file for complete search history.

(56) References Cited

U.S. PATENT DOCUMENTS

| 2006/0074501 A1* | 4/2006 | Hartman | ................... G06N 3/02 700/29 |
| 2007/0083365 A1* | 4/2007 | Shmunk | .............. G10L 21/0272 704/232 |
| 2021/0056357 A1* | 2/2021 | Zhang | .................... G06N 3/084 |
| 2024/0185095 A1* | 6/2024 | Chung | ................... G06N 3/044 |

FOREIGN PATENT DOCUMENTS

CN            111985681 A   *  11/2020   ............. G06F 18/25

OTHER PUBLICATIONS

Article entitled "Learning Multiple Non-Linear Sub-Spaces using K-RBMs" by Chandra et al., dated 2013 (Year: 2013).*

* cited by examiner

*Primary Examiner* — Mahesh H Dwivedi
(74) *Attorney, Agent, or Firm* — FINNEGAN, HENDERSON, FARABOW, GARRETT & DUNNER, LLP

(57) ABSTRACT

The present disclosure generally relates to handling data of non-linear, multi-variable complex systems. More particularly, the present disclosure relates to methods and systems for training machine learning-based computing devices to ensure adaptive sampling of highly complex data packets. The present invention provides a robust and effective solution to implement a complexity-based sampling methodology that trains the neural network in complex mapping regions, by iteratively sampling the DBMS function and training the neural network in complex regions. The system (110) for training the complex and non-linear neural network may be equipped with a Machine Learning (ML) Engine (214) to solve the problem efficiently.

18 Claims, 12 Drawing Sheets

METHOD AND SYSTEM FOR LEARNING BEHAVIOR OF HIGHLY COMPLEX AND NON-LINEAR SYSTEMS

FIELD OF INVENTION

The embodiments of the present disclosure generally relate to handling data of non-linear, multi-variable complex systems. More particularly, the present disclosure relates to methods and systems for training machine learning-based computing devices to ensure adaptive sampling of highly complex data packets.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, neural networks need a large amount of training data for learning non-linear, multi-variable complex systems. In principle, the neural networks can be trained to approximate the behavior of the system with a large set of training data over the entire input range. However, generating data for the entire input range is cumbersome and time-consuming.

Conventional methods for non-linear complex simulations of physical systems use the laws of physics such as thermodynamics, chemical reactions, differential equations, etc. that are simulated to solve for a given input. These simulations are time-taking and are infeasible for running multiple times for the entire operational range in business situations. Linear Approximation of the complex simulations help in faster result generation with acceptable errors, it is less accurate but quick to do and works only for a small range of input domain.

Neural networks can be trained in two ways such as by using pre-collected datasets and by sampling mathematical models which can simulate physical systems. For training neural networks to approximate a black-box model, there are no existing methods wherein the simulation dataset is sampled using a black-box model, or via a Database Management System (DBMS) function that can efficiently simulate the given physical system.

Moreover, the sampling is done linearly and optimized in such a way that more data is sampled where the complexity of the manifold is high while keeping the number of total data points sampled at a minimum. If a DBMS acquires this training data by sampling the points in a given input domain and running this set of input data through the DBMS to generate outputs, then the sampling methodology applied for this process will be uniform random sampling. Uniform random sampling assumes that all points in the input domain are equally significant for the learning task, which, is not sufficient to map highly complex input-output mapping.

There is therefore a need in the art to provide a method and system that can overcome the shortcomings of the existing prior art.

Objects of the Present Disclosure

Some of the objects of the present disclosure, which at least one embodiment herein satisfy are as listed herein below.

An object of the present disclosure is to provide for a method and a system that facilitate adopting smart sampling of large input space with a focused approach on areas of input space with low accuracy.

An object of the present disclosure is to provide a method and a system that facilitate capturing of maximum non-linearity of a system and provide good representation in neural networks.

An object of the present disclosure is to provide a method and a system that require a minimum amount of training data.

An object of the present disclosure is to provide a method and a system that facilitate a higher accurate training model.

An object of the present disclosure is to provide a method and a system that mimic the human learning process.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for training a complex and non-linear neural network. The system receives a set of data packets from the neural network. The neural network comprises non-linear, multi-variable complex computing devices. Further, the system executes a first set of instructions based on the received set of data packets. Further, the system determines a complexity of a region in the set of data packets received based on the executed first set of instructions. The complexity of the region in the set of data packets is determined by curriculum sampling. Further, the system determines a plurality of sample points proportional to the determined complexity of the region. The sample points are uniform and random. Further, the system determines a plurality of regions of constant complexity based on the plurality of sample points.

The plurality of the regions of constant complexity is determined by a regression tree approach. The regression tree approach comprises K-dimensional (KD) trees. The regression tree approach comprises feeding a regression tree with errors in data sampling after a Z score normalization to identify one or more n-dimensional hypercubes. The one or more n-dimensional hypercubes comprise a volume of data points, a number of data points and an average error value of data points. The Z score normalization is calculated for the one or more identified n-dimensional hypercubes. Furthermore, the system trains the non-linear neural network based on the determined plurality of regions of constant complexity. The neural network is trained by feeding a DBMS function with the plurality of sample points in a parallelizable fashion as an input. The DBMS function generates a training dataset of sample data points and a test dataset of sample points as an output. the neural network is trained based on a training dataset of sample data points and a test dataset of sample points. The neural network is trained by an adaptive sampling approach.

In an aspect, the present disclosure provides a method for training a complex and non-linear neural network. The method includes receiving, by a processor, a set of data packets from the neural network. The neural network comprises non-linear, multi-variable complex computing devices. Further, the method includes executing, by the processor, a first set of instructions based on the received set of data packets. Further, the method includes determining, by the processor, a complexity of a region in the set of data packets received based on the executed first set of instructions. The complexity of the region in the set of data packets is determined by curriculum sampling. Further, the method includes determining, by the processor, a plurality of sample points proportional to the determined complexity of the region. The sample points are uniform and random. Further, the method includes determining, by the processor, a plurality of regions of constant complexity based on the plurality of sample points.

The plurality of the regions of constant complexity is determined by a regression tree approach. The regression tree approach comprises K-dimensional (KD) trees. The regression tree approach comprises feeding a regression tree with errors in data sampling after a Z score normalization to identify one or more n-dimensional hypercubes. The one or more n-dimensional hypercubes comprise a volume of data points, a number of data points and an average error value of data points. The Z score normalization is calculated for the one or more identified n-dimensional hypercubes. Furthermore, the method includes training, by the processor, the non-linear neural network based on the determined plurality of regions of constant complexity. The neural network is trained by feeding a DBMS function with the plurality of sample points in a parallelizable fashion as an input. The DBMS function generates a training dataset of sample data points and a test dataset of sample points as an output. the neural network is trained based on a training dataset of sample data points and a test dataset of sample points. The neural network is trained by an adaptive sampling approach.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
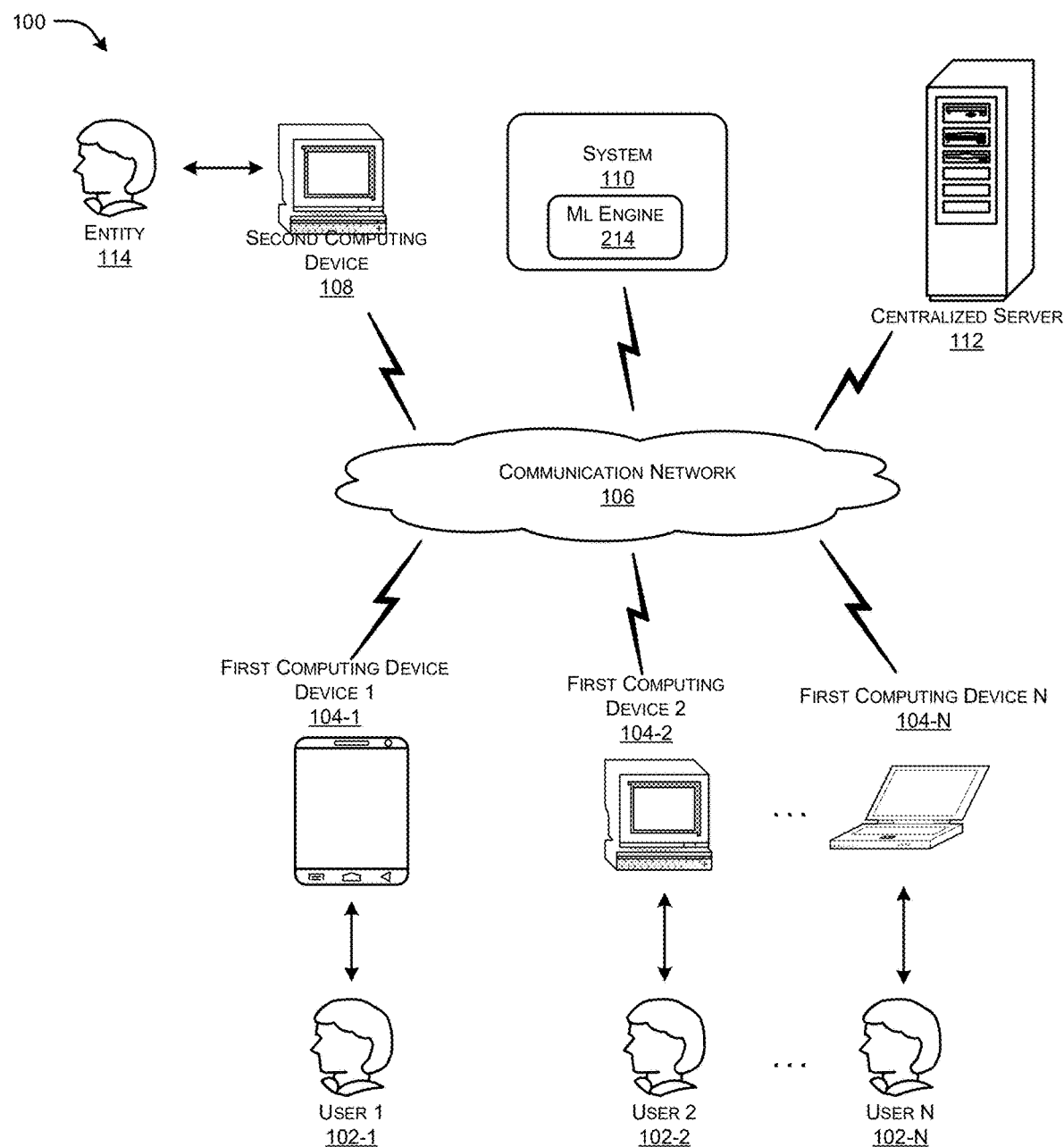
FIG. 1 illustrates an exemplary network architecture representation (100) in which or with which proposed system (110) of the present disclosure can be implemented, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "region" means and includes a sample space of data points wherein the data points are obtained from a highly complex and non-linear neural network as is clear to a person skilled in the art.

As used herein, the term "data complexity" means and includes the intricacy of data, size of data, volume of data, structure of data, and heterogeneity of data in a sample space as is clear to a person skilled in the art.

As used herein, the term "data packet" means and includes raw data of various data types and complexities, that is neither classified nor labeled, and is obtained from a neural network, as is clear to a person skilled in the art.

As used herein, the term "sample points" means and includes data points to be sampled for training a neural network.

As used herein, the term "constant complexity" means and includes a region or a sample space of data points of comparable complexity, as is clear to a person skilled in the art.

As used herein, the term "iteration" means and includes a repetition of a particular instance of a process, as is clear to a person skilled in the art. In the present disclosure, a curriculum sampling approach has been applied on a dataset of raw data points iteratively for sampling complex data points.

As used herein, the term "curriculum sampling" means and includes an iterative sampling approach in which data points are sampled in proportion to the iteration number.

As used herein, the term "regression tree" means and includes a type of decision tree data structure that is used to find pure regions of near constant complexity during the sampling process of training a neural network.

The present invention provides a solution to implement a complexity-based sampling that trains a neural network in complex mapping regions, by iteratively sampling the DBMS function and training the neural network in complex regions. A Machine Learning (ML) or Artificial intelligence (AI) model may be built to solve the problem efficiently. The present invention involves a complexity-based sampling methodology to train the neural network.

Referring to FIG. 1 that illustrates an exemplary network architecture representation (100) in which or with which a system (110) for training a neural network or simply referred to as the system (110) of the present disclosure can be implemented, in accordance with an embodiment of the present disclosure.

In an embodiment, the network architecture (100) may be modular and flexible to accommodate any kind of changes in the system (110) as proximate processing may be acquired for training the neural network. The system (110) configuration details can be modified on the fly.

As illustrated, the system (110) may be equipped with a machine learning (ML) engine (214) for training the neural network. The system (110) may receive a set of data packets from a plurality of first computing devices (104-1, 104-2 ... 104-N) associated with users or employers (102-1, 102-2, 102-3 ... 102-N) (individually referred to as the user (102) or the employer (102) and collectively referred to as the users (102) or the employers (102)).

The system (110) may be further operatively coupled to a second computing device (108) associated with an entity (114). The entity (114) may include a company, a university, a lab facility, a business enterprise, a defence facility, or any other secured facility. The system (110) may be communicatively coupled to the one or more first computing devices (individually referred to as the first computing device (104) and collectively referred to as the first computing devices (104).

In an exemplary embodiment, the first computing devices (104) may include non-linear and complex physical arrangements performing complex physical or chemical processes but not limited to the like. Examples of non-linear and complex physical arrangements may be nuclear reactors and the like. Learning to understand the behaviour of nuclear reactors may be of high criticality and high risk than in comparison learning about water heaters and the like.

In an embodiment, the one or more first computing devices (104) and the one or more second computing devices (108) may communicate with the system (110) via a set of executable instructions residing on any operating system, including but not limited to, Android™, iOS™, Kai OS™ and the like.

In an embodiment, the one or more first computing devices (104) and the one or more second computing devices (108) may include, but not limited to, any electrical, electronic, electro-mechanical, or any equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as a touchpad, a touch-enabled screen, an electronic pen, receiving devices for receiving any audio or visual signal in any range of frequencies and transmitting devices that can transmit any audio or visual signal in any range of frequencies. It may be appreciated that the one or more first computing devices (104) and the one or more second computing devices (108) may not be restricted to the mentioned devices and various other devices may be used. A smart computing device may be one of the appropriate systems for storing data and other private/sensitive information.

The system (110) may be coupled to a centralized server (112). The centralized server (112) may also be operatively coupled to the one or more first computing devices (104) and the second computing devices (108) through a communication network (106).

In another exemplary embodiment, the centralized server (112) may include or comprise, by way of example but not limitation, one or more of a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an exemplary embodiment, the communication network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In an embodiment, the system (110) may execute, a first set of instructions (interchangeably referred to as curriculum sampling) through the ML engine (214) on a received set of data packets. The first set of instructions may be for determining a complexity of a region in the set of data packets received. The system (110) may then sample a plurality of data points proportional to the complexity of the region in a plurality of iterations. The system (110) may sample the plurality of highly complex data points by an iterative curriculum sampling approach. In the iterative curriculum sampling approach, data points are sampled iteratively by starting with a coarse level dataset and gradually moving to the highly complex dataset with each iteration of the sampling process. The system (110) may further be configured to determine, with a regression tree, by the ML engine (214), a plurality of regions of constant complexity. In a way of example and not as a limitation, the regression tree may include K-dimensional (KD) Trees and the like.

The system (110) may then train the neural network by the DBMS function. The DBMS function may generate weights for each iteration during iterative curriculum sampling process. Further, the system (110) may train the neural network until a predefined threshold may be reached. The predefined threshold may pertain to an accuracy of the trained neural network in the region for the iteration. Herein, the predefined threshold and the accuracy of the trained neural network may be a level at which the model reaches 1% of the error and the training stops.

In a way of example and not as a limitation, the DBMS function may attempt to simulate a complex physical or chemical process with an objective function. The DBMS function is often supported with domain-specific tools, such as a simulation software. A multidimensional input range may be selected based on domain knowledge.

In an exemplary embodiment, the architecture of the neural network may be initialized with random weights and biases and then fed in as a hyperparameter to a training pipeline associated with the system (110).

Figure 2:
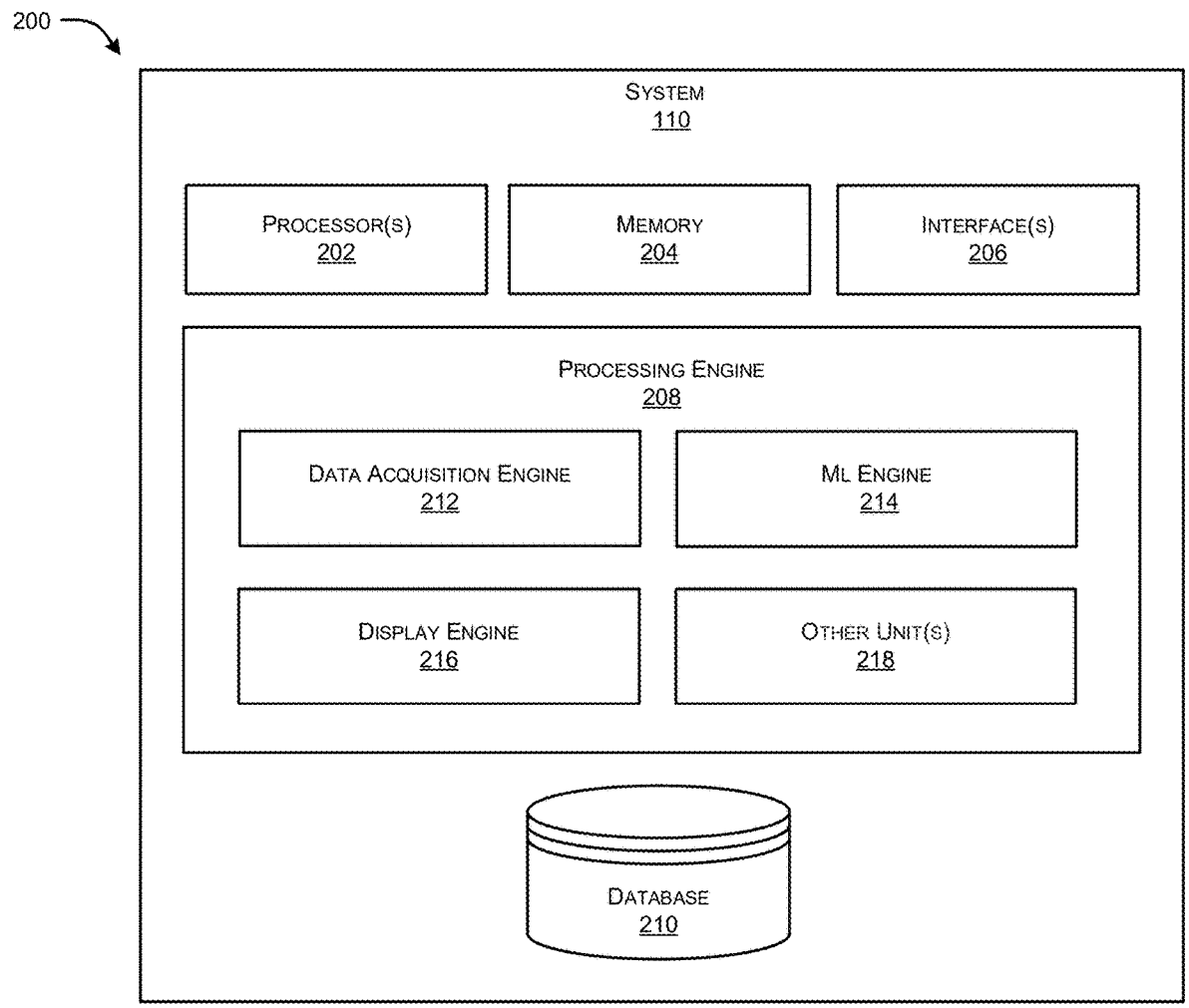
FIG. 2 illustrates an exemplary representation (200) of the proposed system (110) for training a neural network, in accordance with an embodiment of the present disclosure.

FIG. 2 with reference to FIG. 1, illustrates an exemplary representation (200) of the system (110) for facilitating training of the neural network, in accordance with an embodiment of the present disclosure. In an aspect, the system (110) may comprise one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions.

Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) (206). The interface(s) (206) may comprise a variety of interfaces, for example, interfaces for data input and output devices, referred to as I/O devices, storage devices, and the like. The interface(s) (206) may facilitate communication of the system (110). The interface(s) (206) may also provide a communication pathway for one or more components of the system (110). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor-executable instructions stored on a non-transitory machine-readable storage medium. Hardware for the processing engine(s) (208) may comprise a processing resource (for example, one or more processors), to execute such instructions. In the present examples, the machine-readable storage medium may store instructions that, when executed by the processor (202), may implement the processing engine(s) (208). In such examples, the system (110) may comprise the machine-readable storage medium storing the instructions and the processor (202) to execute the instructions. The machine-readable storage medium may also be separate but accessible to the system (110). In other examples, the processing engine(s) (208) may be implemented by electronic circuitry.

Figure 3:
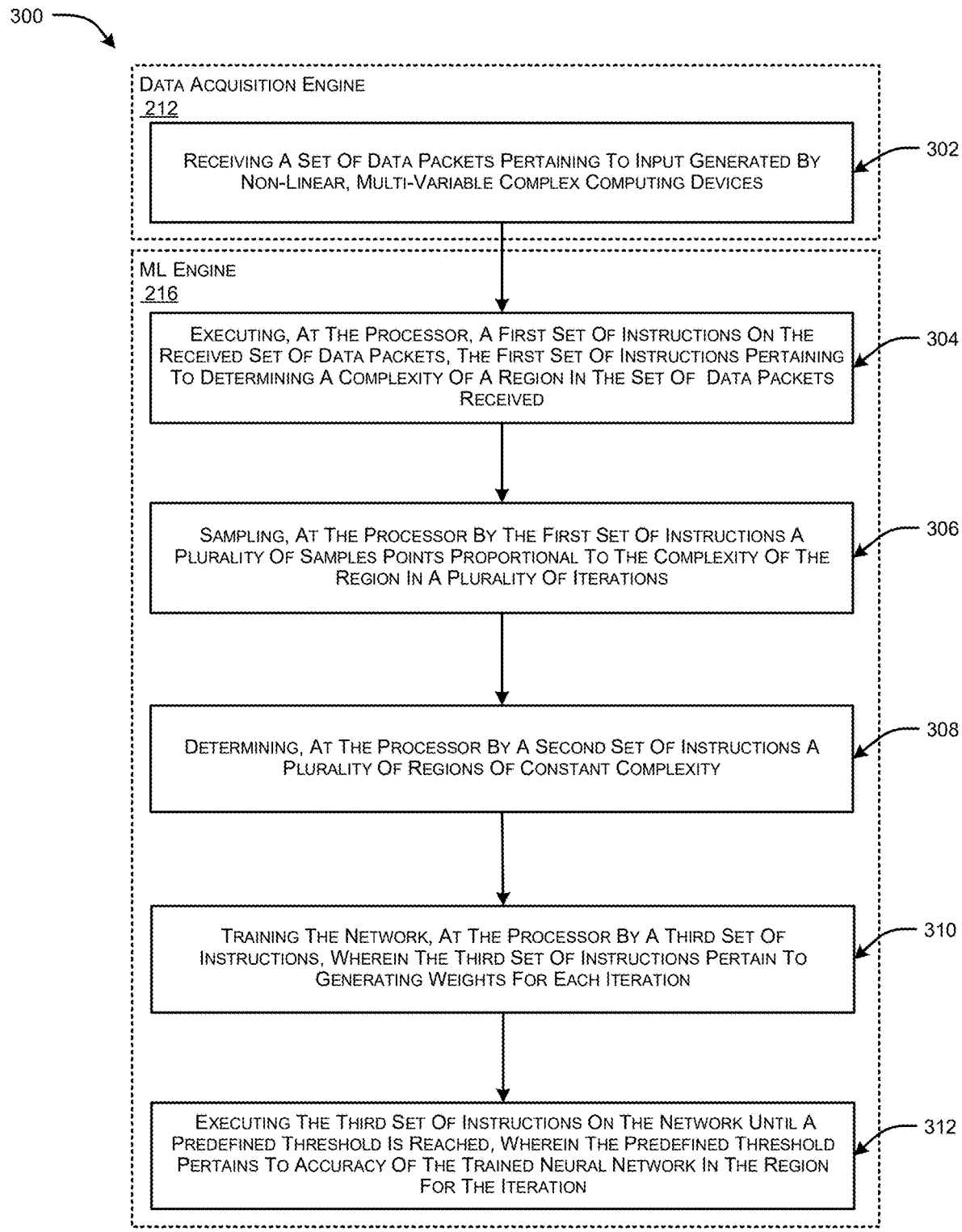
FIG. 3 illustrates an exemplary flow diagram representation (300) of a proposed method, in accordance with an embodiment of the present disclosure.

The processing engine (208) may include one or more engines selected from any of a data acquisition engine (212), an ML engine (214), a display engine (216), and other engines (218). The processing engine (208) may further be for complex sampling processing but not limited to the like. The data acquisition engine (212) may be configured to receive a set of data packets from the neural network. The data packets may comprise data points to be sampled by an iterative curriculum sampling approach for training of the highly complex and non-linear neural network. The ML Engine (214) may be configured to determine a complexity of a region in the set of data packets received based on the executed first set of instructions. Further, the ML Engine (214) may be configured to determine a plurality of sample points proportional to the determined complexity of the region. Further, the ML Engine (214) may be configured to determine a plurality of regions of constant complexity and train the highly complex and non-linear neural network. The display engine (216) may be configured to display a DBMS visualization for a complete input space of sample data points. Further, the display engine (216) may also be configured to visualize various iterations of curriculum sampling during the training of the highly complex and non-linear neural network FIG. 3 illustrates an exemplary flow diagram representation (300) of a proposed method, in accordance with an embodiment of the present disclosure. As illustrated, the method (300) for training a neural network may include at 302, the step of receiving the set of data packets that comprise of data points, by the data acquisition engine (212), pertaining to an input generated by the highly complex and non-linear neural network. At 304, the step of executing, by the ML Engine (214), the first set of instructions. The first set of instructions may pertain to determining the complexity of a region.

The method (300) may further include at 306, the step of determining, by the ML Engine (214) the plurality of sample points. In an embodiment, the plurality of sample points may be proportional to the complexity of the region in a plurality of iterations of the iterative curriculum sampling approach. At 308, the step of determining, by the ML Engine (214) a plurality of regions of constant complexity may take place.

Furthermore, the method (300) may include at 310, the step of training the neural network, by the ML Engine (214) of the system (110) by generating weights for the iterations. At step 312, the step of executing the third set of instructions on the neural network, by the ML Engine (214), may take place until the predefined threshold may be reached. The predefined threshold may pertain to the accuracy of the trained neural network in the region of the iteration.

Figure 4:
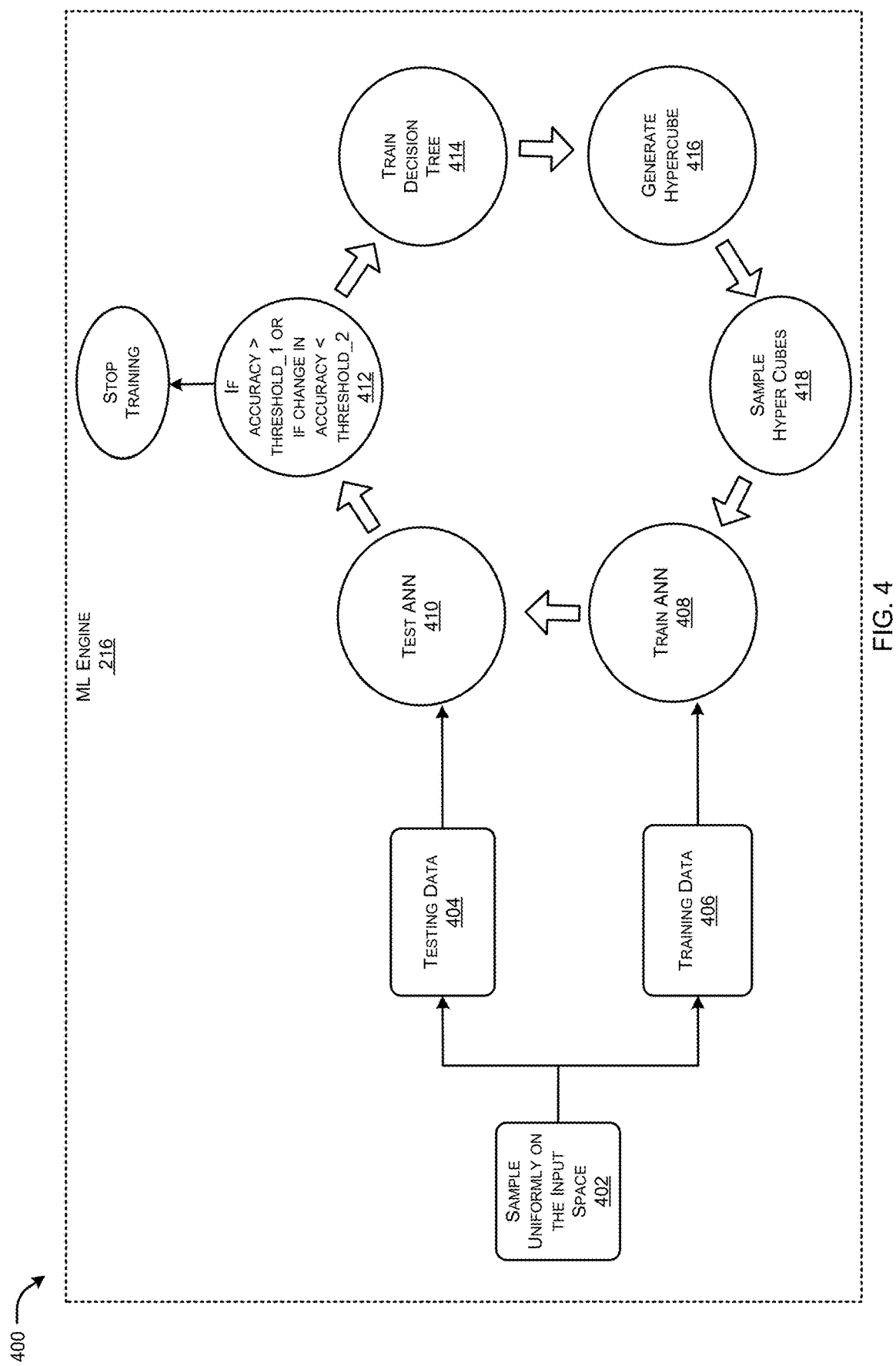
FIG. 4 illustrates an exemplary block representation (400) of a detailed sampling method, in accordance with an embodiment of the present disclosure.

FIG. 4 illustrates an exemplary block representation (400) of a detailed sampling method for training the neural network executed by the ML Engine (214), in accordance with an embodiment of the present disclosure. As illustrated, in an aspect, at block 402, a uniform random sampling may be performed in a given input range of data points. One or more input samples generated per iteration may be a hyperparameter to a training pipeline where the hyperparameter may be a parameter for specifying a complexity and a learning capacity of the highly complex and non-linear neural network to be trained. The one or more input samples may be provided to the DBMS function in a parallelizable fashion. One or more output sample points for the one or more input samples may be generated by the DBMS function. The one or more output sample points generated may be divided into a training dataset (406) and a test dataset (404). A batch importance parameter, λ, may be assigned to the initial training dataset (406). The batch importance parameter may be a hyperparameter that may specify the number of data points to be sampled by the system (110) for training the highly complex and non-linear neural network. The batch importance parameter, 2, may be, at least but not limited to, 1.0.

In an exemplary embodiment, a training process may begin by choosing an optimizer and a learning rate of the optimizer. The optimizer may be used to estimate a loss function for training the highly complex and non-linear neural network. The optimizer used can be but not limited to an Adam Optimizer. The highly complex and non-linear neural network may be trained by the system (110) on the sampled dataset of data points for a given number of epochs. An epoch may be a hyperparameter that may represent one cycle of sampling an entire dataset of data points. The loss function that may be used to train the neural network may be defined as:

$$\frac{1}{\max(i)} \sum_i \frac{1}{N} \sum_j \lambda^{(i-\max(i))} * (y_{ij} - \bar{y}_{ij})^2$$

where i is the sampling iteration
j is the sample in $i^{th}$ iteration
max(i) is the current sampling iteration
N is the number of samples generated per iteration
λ is the batch importance parameter
$y_{ij}$ and $\bar{y}_{ij}$ are the target and predicted output values In an exemplary embodiment, a trained neural network (408) may be tested on the training dataset (406) by the ML Engine (214) of the system (110). A mean squared error may be calculated for each sample data point in the training dataset (406). A tested neural network (410), obtained from the trained neural network (408), may be first checked for accuracy with a testing data (404). At block 412, if the accuracy may be greater than a first predefined threshold, or if a change in value of the first predefined threshold is less than a second predefined threshold value, then a decision tree, that may be a regression tree, may be trained at block 414. Since no geometry could capture an actual error cloud, n-dimensional hypercubes may be generated (416) to approximate an error distribution in the training dataset (406) space by the ML Engine (214) of the system (110). The decision tree, that may be the regression tree, may then be used to identify and sample the n-dimensional hypercubes (418) for training the neural network (408).

In an exemplary embodiment, the regression tree may be trained on the one or more input samples against the mean squared error of the one or more output samples predicted by the neural network. The regression tree may be trained to identify pure regions in an error domain. The pure regions may have almost constant error values. To identify the pure regions, a depth-first search algorithm may be implemented on the trained regression tree, and decision rules leading to leaf nodes may be identified. The decision rules may identify pure n-dimensional hypercubes generated by the ML Engine (214) of the system (110) in the error domain.

Figure 5A:
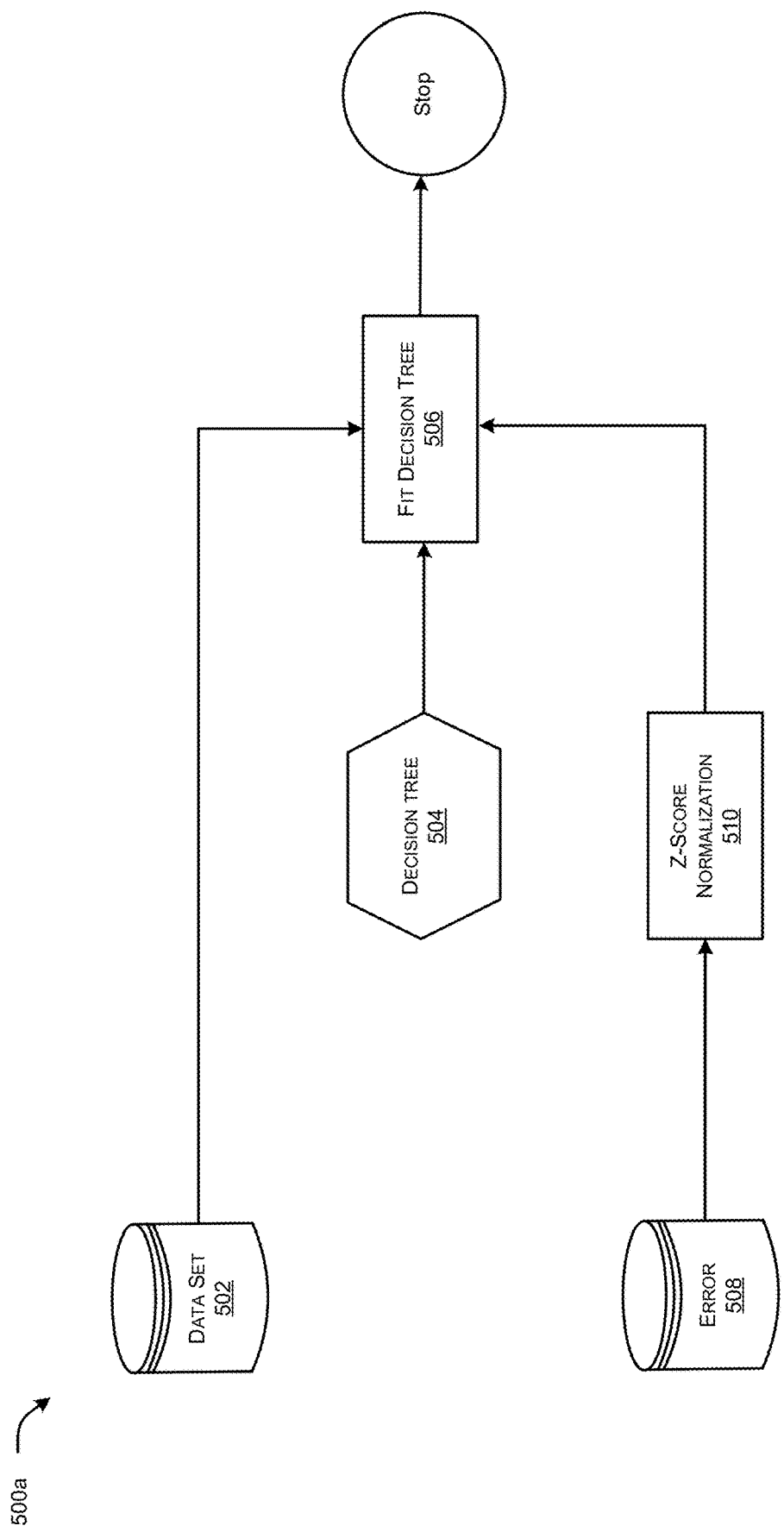
FIGS. 5A-5C illustrate exemplary block diagram representations (500a, 500b, and 500c) of hypercubes, in accordance with an embodiment of the present disclosure.
Figure 5B:
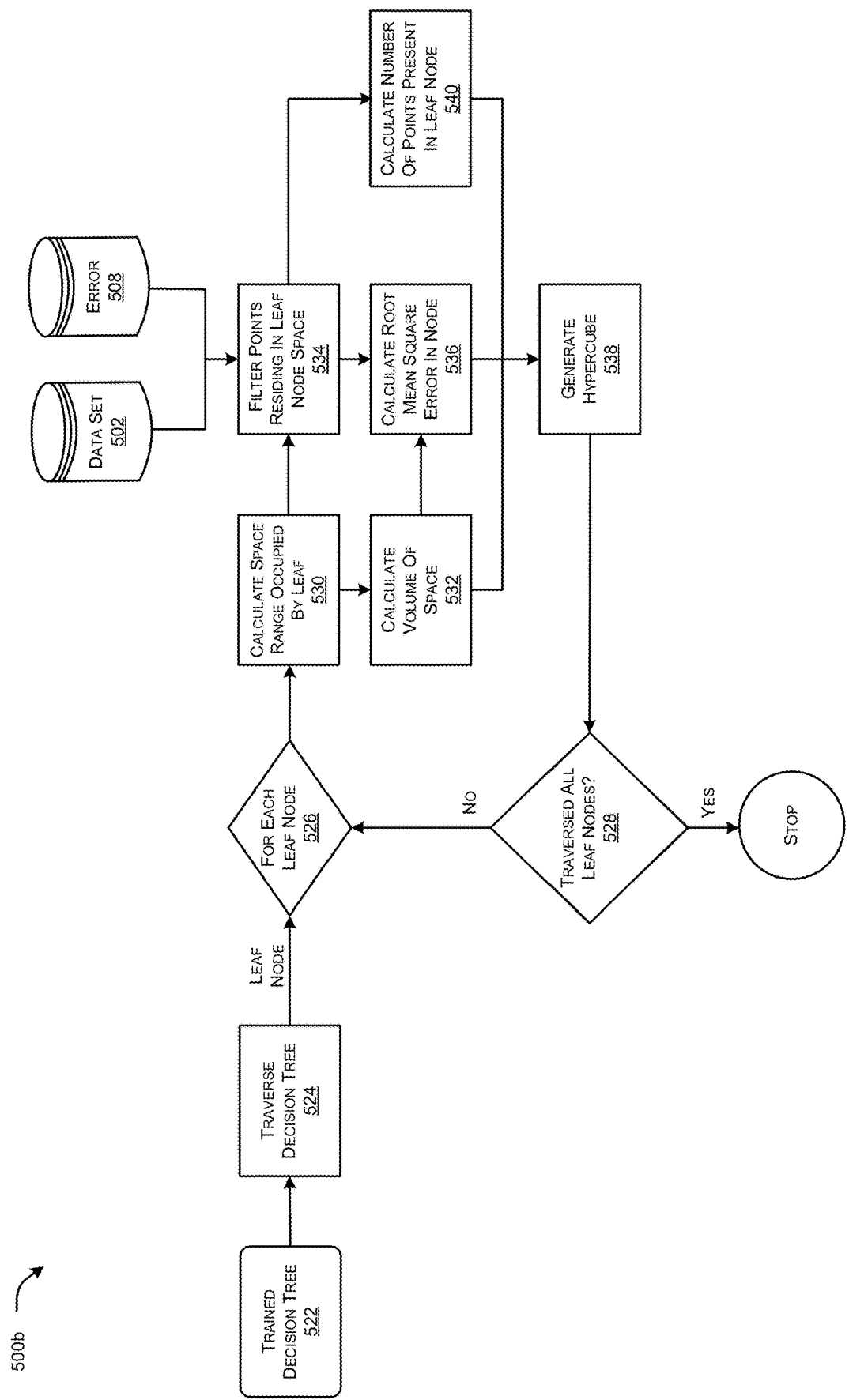
Figure 5C:
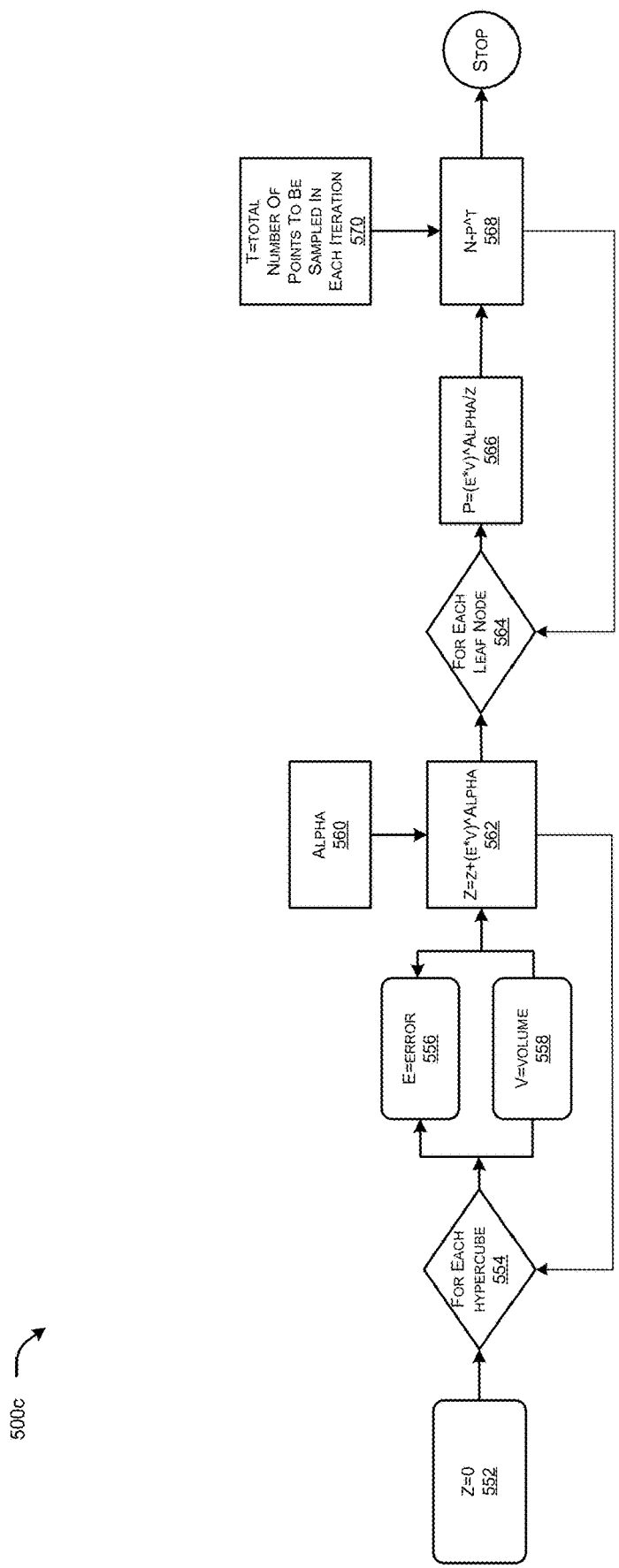

FIGS. 5A-5C illustrate exemplary block diagram representations (500a, 500b, and 500c) of pure n-dimensional hypercubes generated by the ML Engine (214) of the system (110), in accordance with an embodiment of the present disclosure. As illustrated, the hypercube may include a dataset (502) that may be sent to a fit decision tree that may be a regression tree (506) governed by a predefined decision tree algorithm (504). The fit decision tree that may be the regression tree (506) may also be fed with errors (508), after the errors (508) may have undergone a Z score normalization (510).

In an exemplary embodiment, the hypercube may be defined by a volume, one or more sample data points, and an average error value associated with the one or more sample data points in an encompassed region. The hypercube may be expressed as $$\text{hypercube: } \{n_k^t, e_k^t, v_k^t\}_k^L$$

where $$n_k^t, e_k^t, v_k^t$$

are the number or sample data points, k the average error value, and the volume of the $k^{th}$ hypercube, and L is a number of leaf nodes learnt by the regression tree.

In an exemplary embodiment, the normalizing parameter, Z may be calculated for the entire set of pure n-dimensional hypercubes $$Z = \sum_k (e_k^t \times v_k^t)^\alpha$$

where α is a hyperparameter required for exponential sampling numbers

As illustrated in FIG. 5B, a trained decision tree, at block 522, may be traversed, at block 524, to generate leaf nodes. For the leaf nodes, at block 526, a space range occupied by the leaf nodes may be calculated at block 530. A volume of the space range occupied by the leaf nodes may be calculated at block 532. At block 534, data points residing in the leaf node space may be filtered by receiving the dataset from block 502 and the errors from block 508. Next, a root mean square error of the leaf nodes may be calculated at block 536. Further, at block 540, the number of data points present in the leaf nodes may be calculated. From blocks 532, 536, and 540, n-dimensional hypercubes may be generated at block 538. Then, if all the leaf nodes have been traversed or not may be checked. If all the leaf nodes may not have been traversed then the procedure may start again. If all the leaf nodes may have been traversed then the procedure may be stopped.

As illustrated in FIG. 5C, at block 552, the normalizing parameter, Z, may be initialized to 0 for the hypercube at block 554. At block 556, an error value may be stored in e and a volume in v in block 558. The error values in e and the volume in v may be given to block 562 to calculate $$Z = Z + \sum_k (e_k^t \times v_k^t)^\alpha.$$

A final value of the normalizing parameter, Z, may be updated for the hypercubes at block 564 along with the value of α obtained from block 560. A target density for the hypercubes may be calculated $$p_k^t = \frac{(e_k^t \times v_k^t)^\alpha}{Z}$$

at block 566. New samples may be uniformly sampled in the hypercube, with the number of samples being proportional to the target density of the hypercube. The number of samples may be spread and an intensity of the error values in a pure region may be used to decide a total number of points to be sampled at block 570 in the iteration as may be given by $$Z_k^t = N \times p_k^t$$

at block 568.

In an exemplary embodiment, new samples may be passed into the DBMS function to generate the one or more output samples. The input sample points and the output sample points generated across the hypercubes may be concatenated to create a second batch of training data. The training data may be given the batch importance parameter proportional to the iteration number. The training process may be continued until the neural network achieves an acceptable error on the test dataset.

Figure 6A:
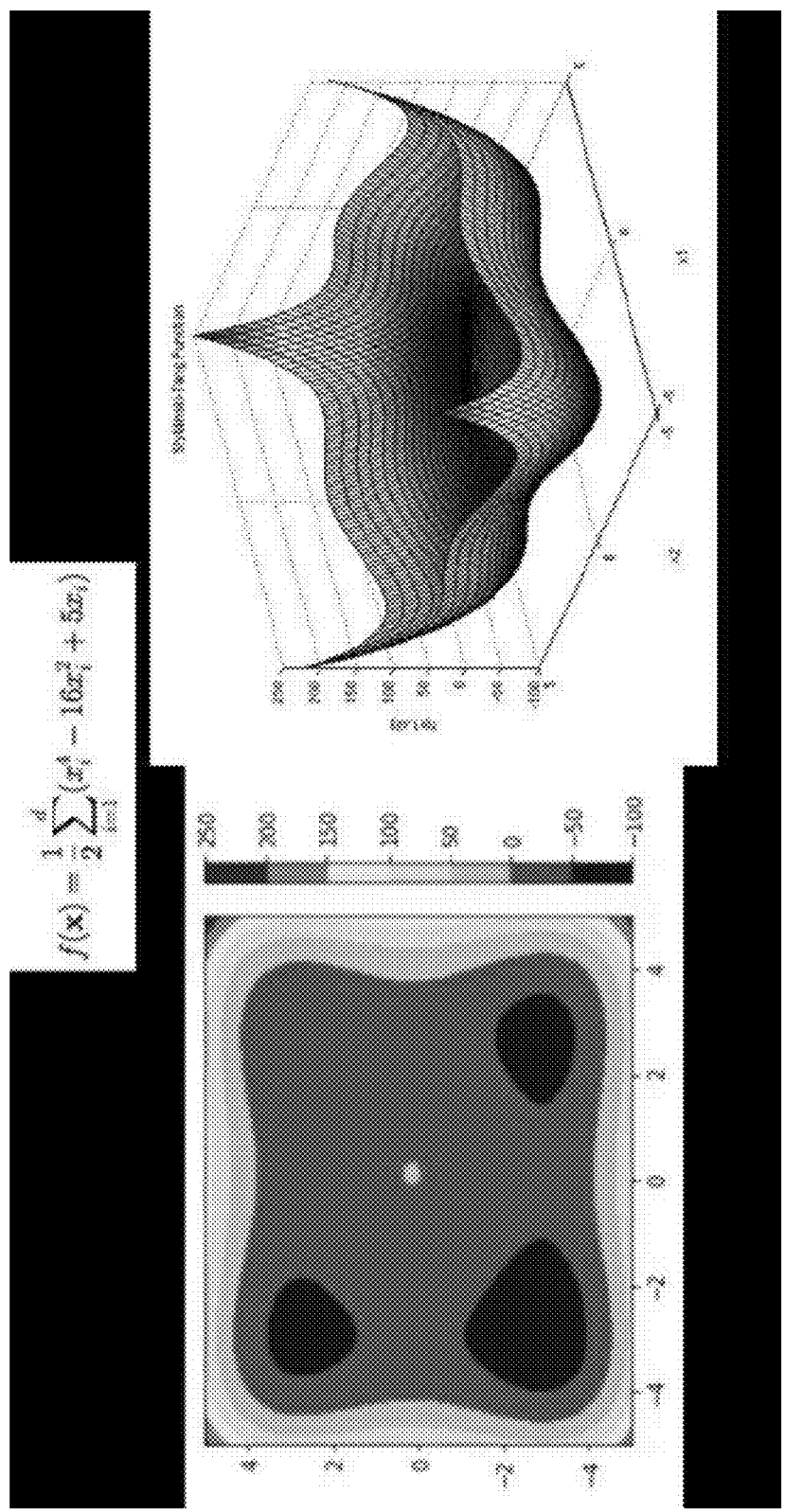
FIGS. 6A-6E illustrates exemplary representations (600a, 600b, 600c, 600d, and 600e) of the analysis of the proposed method, in accordance with an embodiment of the present disclosure.

FIGS. 6A-6E illustrates exemplary representations (600a, 600b, 600c, 600d, and 600e) of the analysis of the proposed method of training the neural network by the ML Engine (214) as displayed by the display engine (216) of the system (110), in accordance with an embodiment of the present disclosure. As illustrated in FIGS. 6A-6E in a way of example and not as a limitation, a use case scenario using but not limited to a "Styblinski Tang" objective function with visualization of accuracy loss in a sample space has been shown. FIG. 6A shows a DBMS visualization for a complete input space that may be implemented by the display engine (216) of the system (110). 'Styblinski Tang' may be a benchmark objective function used for testing optimization algorithms. 'Styblinski Tang' may consist of 4 local minima and 1 global minima. Although the objective function can be used for multi-dimension input, as an example, a 2-D version of the objective function may be used for visualizing various iterations of the training algorithm by the display engine (216) of the system (110). As can be seen in FIGS. 6A-6E, the objective function may be highly non-linear near the manifold of local minimas.

Figure 6B:
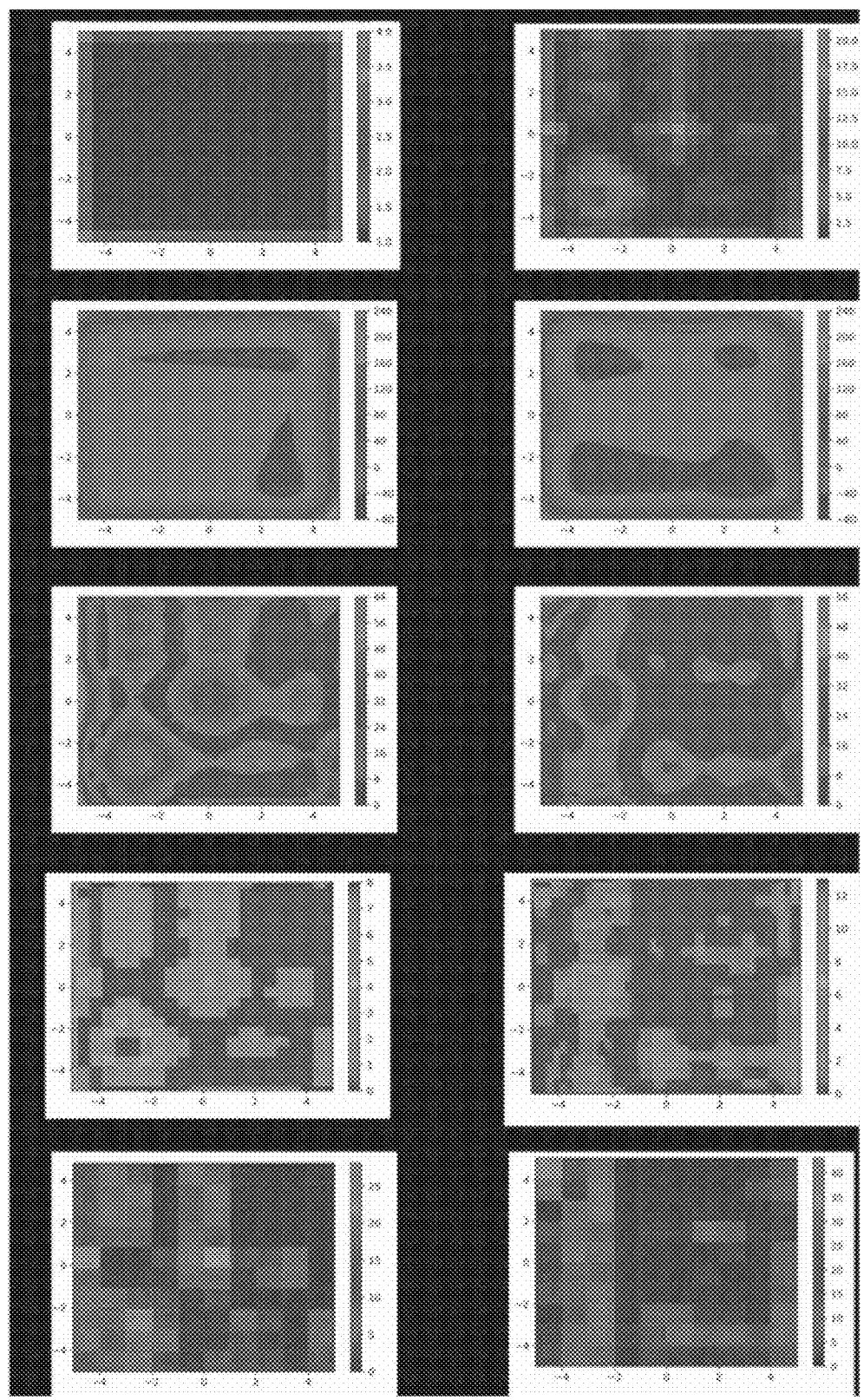
Figure 6C:
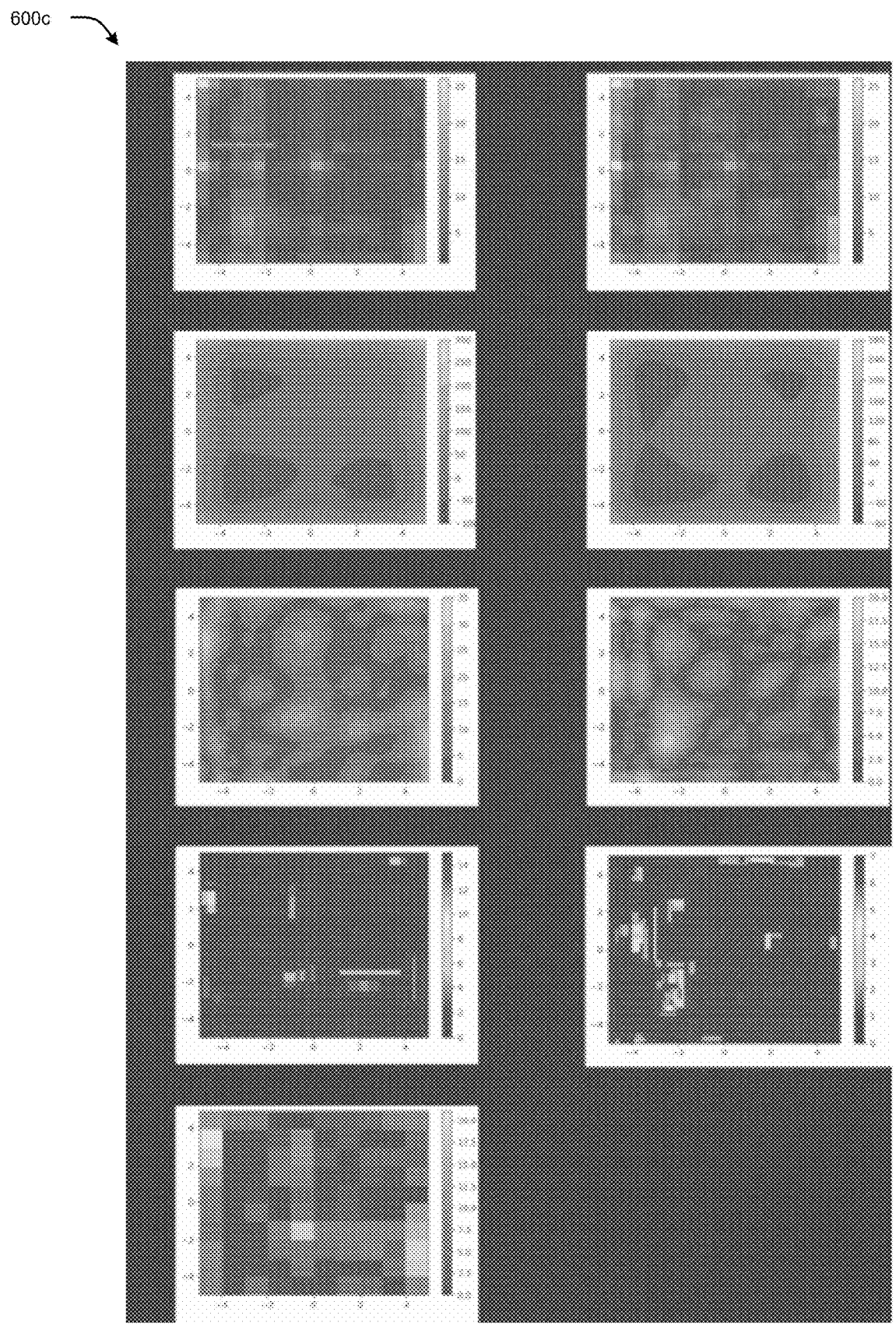
Figure 6D:
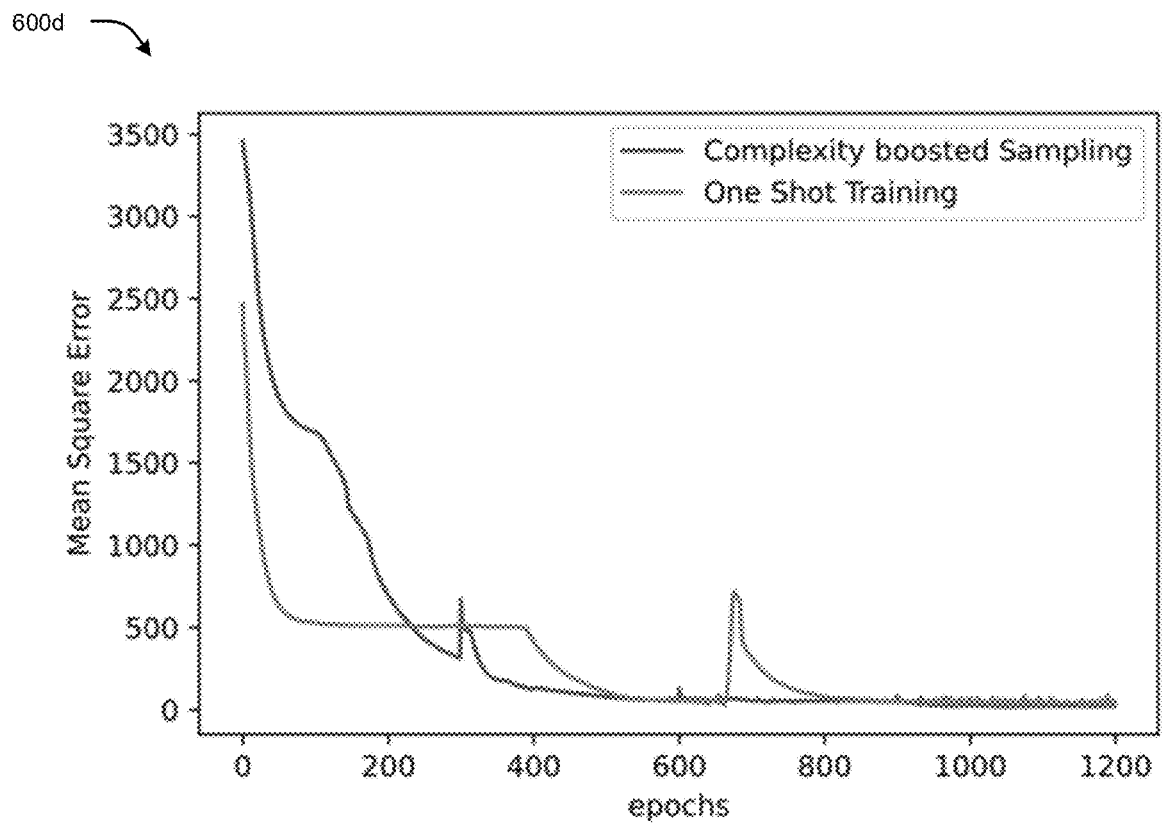
Figure 6E:
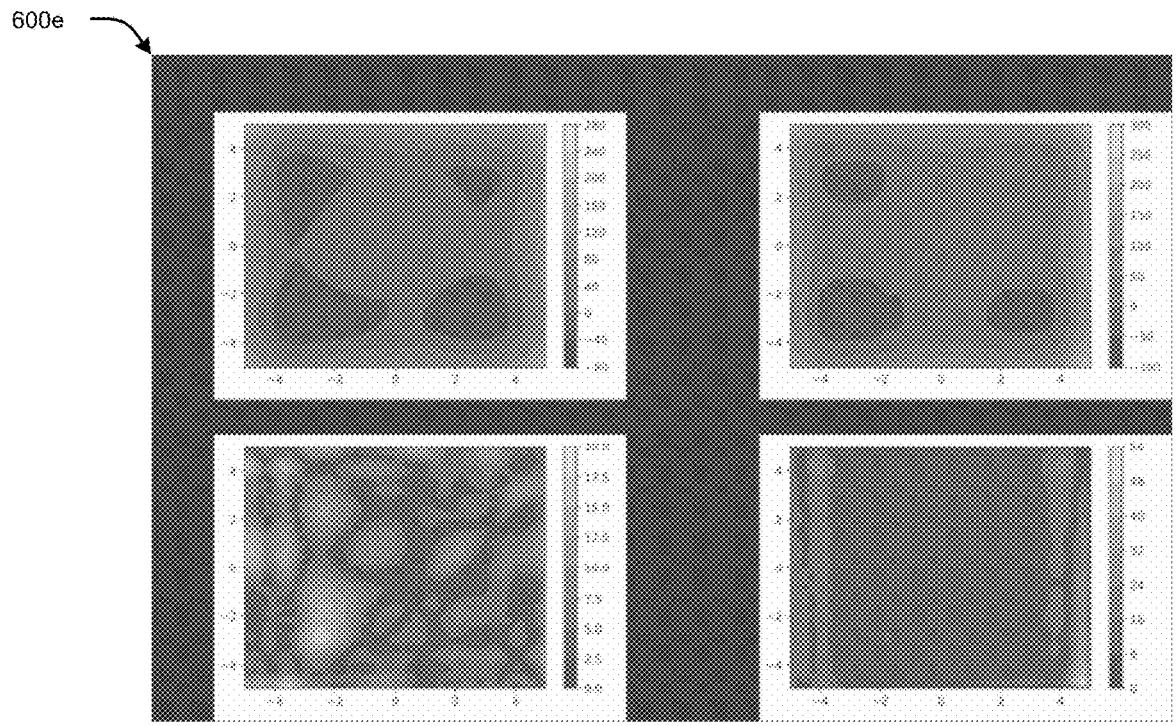

FIGS. 6B and 6C visualize the training and the sampling process at time steps T=1,2,3,4 as projected by the display engine (216) of the system (110). It can be observed that the error value may keep decreasing with iterations as new data may be generated. The number of points to be sampled in the hypercube may depend on the average RMSE value of the hypercube. FIG. 6D illustrates a comparison of a training methodology with a one-shot training methodology respectively applied for training the highly complex and non-linear neural network by the ML engine (214) of the system (110). In the one-shot training methodology, the training data may be generated by uniformly sampling points in the whole input space. The neural network may be trained by the ML engine (214) of the system (110) for a certain number of iterations on the training data. As can be observed from FIG. 6E, a complexity boosted sampling-based trained neural network (ANN) may achieve a lower error in lesser number of iterations on the training set as compared to a one-shot trained ANN. Both the ANN and the one-shot trained ANN may have the same architecture and the same initialized weights.

Figure 7:
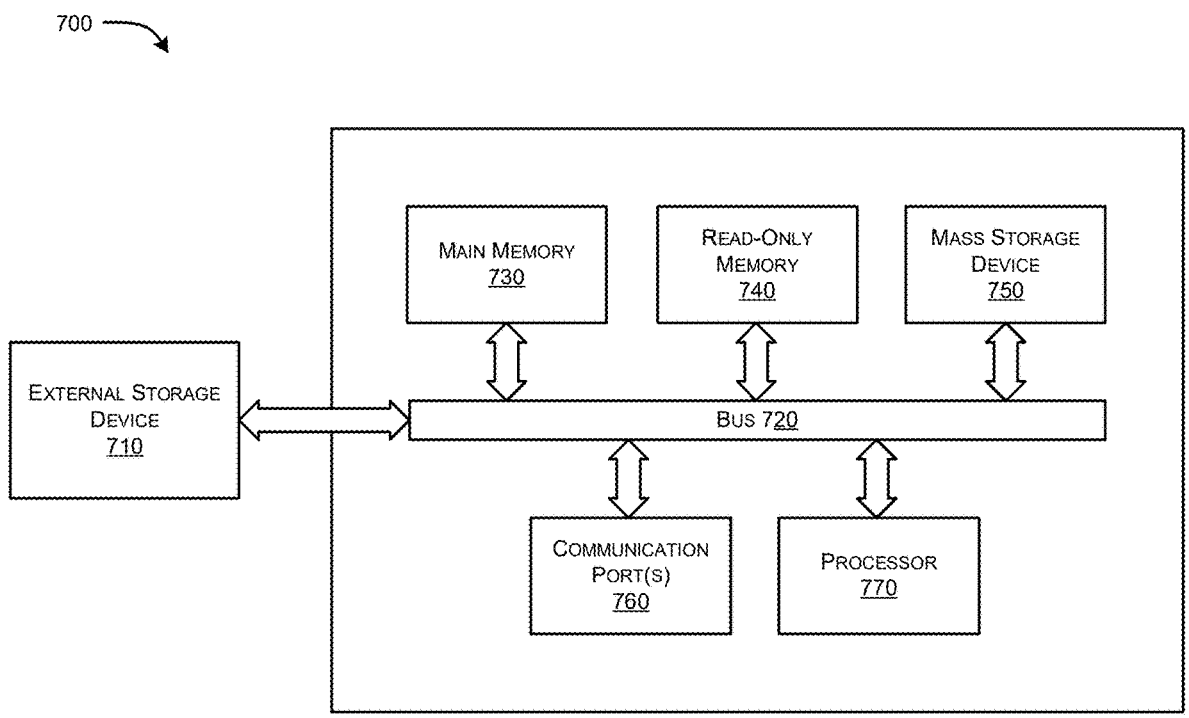
FIG. 7 illustrates an exemplary computer system (700) in which or with which embodiments of the present invention can be utilized, in accordance with embodiments of the present disclosure.

FIG. 7 illustrates an exemplary computer system (700) in which or with which embodiments of the present invention can be utilized in accordance with embodiments of the present disclosure. As shown in FIG. 7, the computer system can include an external storage device (710), a bus (720), a main memory (730), a read-only memory (740), a mass storage device (750), a communication port (760), and a processor (770). A person skilled in the art will appreciate that the computer system may include more than one processor and communication ports. Examples of the processor (770) include, but are not limited to, an Intel® Itanium® or Itanium 2 processor(s), AMD® Opteron® or Athlon MP® processor(s), Motorola® lines of processors, FortiSOC™ system on chip processors, or other future processors. The processor (770) may include various modules associated with embodiments of the present invention. The communication port (760) can be any of RS-232 port for use with a modem-based dialup connection, a 10/100 Ethernet port, a Gigabit, or 10 Gigabit port using copper or fiber, a serial port, a parallel port, or other existing or future ports. The communication port (760) may be chosen depending on a network, such as a Local Area Network (LAN), Wide Area Network (WAN), or any network to which computer system connects.

The memory (730) can be Random Access Memory (RAM), or any other dynamic storage device commonly known in the art. Read-only memory 740 can be any static storage device(s) e.g., but not limited to, a Programmable Read Only Memory (PROM) chips for storing static information e.g., start-up or BIOS instructions for the processor (770). The mass storage (750) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 7K800), one or more optical discs, Redundant Array of Independent Disks (RAID) storage, e.g. an array of disks (e.g., SATA arrays), available from various vendors.

The bus (720) communicatively couples the processor(s) (770) with the other memory, storage, and communication blocks. The bus (720) can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects the processor (770) to the computer system.

Optionally, operator and administrative interfaces, e.g., a display, keyboard, and a cursor control device, may also be coupled to the bus (720) to support direct operator interaction with a computer system. Other operator and administrative interfaces can be provided through network connections connected through the communication port (760). The external storage device (710) can be any kind of external hard drive, floppy drive, IOMEGA® Zip Drives, Compact Disc-Read Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

Thus, the present disclosure provides a system and method for data sampling in a system with unknown behavior patterns and associated with risks of predicting a bad output. For example, learning to understand the behavior of a nuclear reactor is of high criticality and high risk than in comparison to learning a water heater. For a complex system, a large amount of data may be required to be sampled for an entire input range of sample data points, thus enabling the neural network to learn and capture all the possible input/output combinations. Using adaptive sampling the dataset of sample points may be sampled only densely in the region of maximum inaccuracy. Adaptive sampling may reduce redundant data generation for the region of high accuracy, saving time and efforts to quickly learn a complex system.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter is to be implemented merely as illustrative of the invention and not as limitation.

RESERVATION OF RIGHTS

A portion of the disclosure of this patent document contains material, which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

We claim:

1. A system for training a complex and non-linear neural network, the system comprising:
    a processor;
    a memory coupled to the processor, wherein the memory comprises processor-executable instructions, which on execution, causes the processor to:
        receive a set of data packets from the neural network;
        execute a first set of instructions based on the received set of data packets;
        determine a complexity of a region based on the executed first set of instructions;
        determine a plurality of sample points proportional to the determined complexity of the region;
        determine a plurality of regions of constant complexity based on the plurality of sample points, wherein the plurality of the regions of constant complexity is determined by a regression tree approach, wherein the regression tree approach comprises K-dimensional (KD) trees, and wherein the regression tree approach comprises feeding a regression tree with errors in data sampling after a Z score normalization to identify one or more n-dimensional hypercubes; and
        train the non-linear neural network based on the determined plurality of regions of constant complexity, wherein the neural network is trained by feeding a Database Management System (DBMS) function with the plurality of sample points in a parallelizable fashion as an input.

2. The system as claimed in claim 1, wherein the neural network comprises non-linear, multi-variable complex computing devices.

3. The system as claimed in claim 1, wherein the sample points are uniform and random.

4. The system as claimed in claim 1, wherein the complexity of the region in the set of data packets is determined by curriculum sampling.

5. The system as claimed in claim 1, wherein the one or more n-dimensional hypercubes comprise a volume of data points, a number of data points and an average error value of data points.

6. The system as claimed in claim 1, wherein the Z score normalization is calculated for the one or more identified n-dimensional hypercubes.

7. The system as claimed in claim 1, wherein the DBMS function generates a training dataset of sample data points and a test dataset of sample points as an output.

8. The system as claimed in claim 1, wherein the neural network is trained based on a training dataset of sample data points and a test dataset of sample points.

9. The system as claimed in claim 1, wherein the neural network is trained by an adaptive sampling approach.

10. A method for training a complex and non-linear neural network, the method comprising:
- receiving, by a processor, a set of data packets from the neural network;
- executing, by the processor, a first set of instructions based on the received set of data packets;
- determining, by the processor, a complexity of a region in the set of data packets received based on the executed first set of instructions;
- determining, by the processor, a plurality of sample points proportional to the determined complexity of the region;
- determining, by the processor, a plurality of regions of constant complexity based on the plurality of sample points, wherein the plurality of the regions of constant complexity is determined by a regression tree approach, wherein the regression tree approach comprises K-dimensional (KD) trees, and wherein the regression tree approach comprises feeding a regression tree with errors in data sampling after a Z score normalization to identify one or more n-dimensional hypercubes; and
- training, by the processor, the non-linear neural network based on the determined plurality of regions of constant complexity, wherein the neural network is trained by feeding a DBMS function with the plurality of sample points in a parallelizable fashion as an input.

11. The method as claimed in claim 10, wherein the neural network comprises non-linear, multi-variable complex computing devices.

12. The method as claimed in claim 10, wherein the sample points are uniform and random.

13. The method as claimed in claim 10, wherein the complexity of the region in the set of data packets is determined by curriculum sampling.

14. The method as claimed in claim 10, wherein the one or more n-dimensional hypercubes comprise a volume of data points, a number of data points and an average error value of data points.

15. The method as claimed in claim 10, wherein the Z score normalization is calculated for the one or more identified n-dimensional hypercubes.

16. The method as claimed in claim 10, wherein the DBMS function generates a training dataset of sample data points and a test dataset of sample points as an output.

17. The method as claimed in claim 10, wherein the neural network is trained based on a training dataset of sample data points and a test dataset of sample points.

18. The method as claimed in claim 10, wherein the neural network is trained by an adaptive sampling approach.

* * * * *